Nov. 19, 1929.   F. BEEMER   1,736,110
BALL BEARING CASTER
Filed June 25, 1927   2 Sheets-Sheet 1
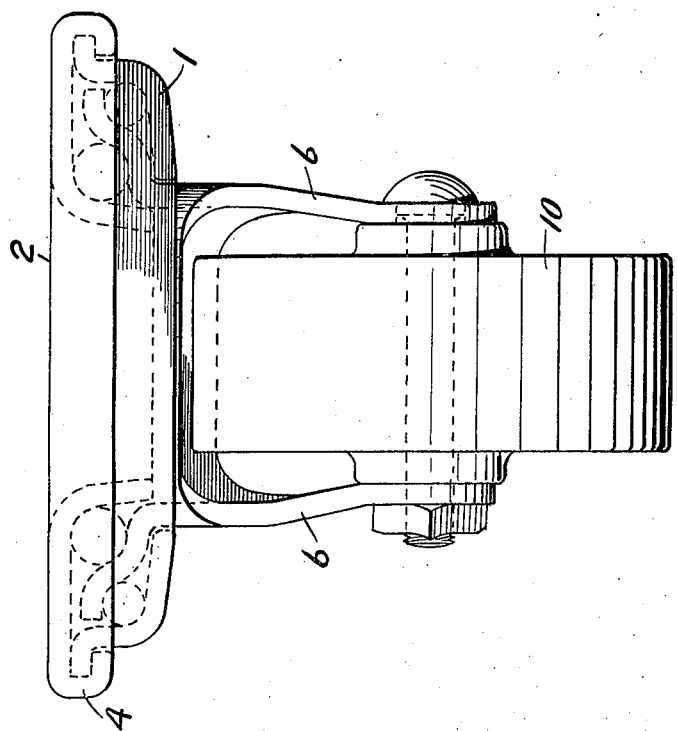
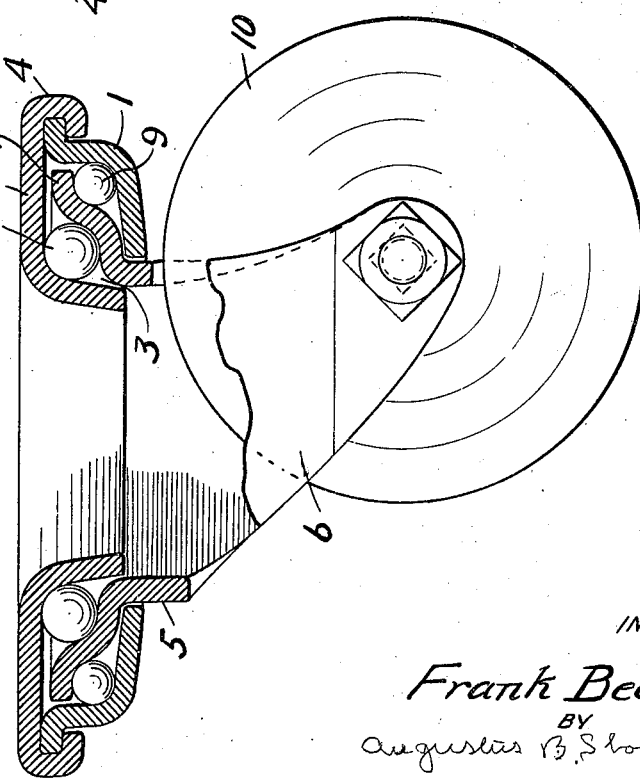
WITNESS:
Rob P Mitchel
INVENTOR
Frank Beemer
BY
Augustus B. Stoughton.
ATTORNEY.

Nov. 19, 1929.   F. BEEMER   1,736,110
BALL BEARING CASTER
Filed June 25, 1927   2 Sheets-Sheet 2

WITNESS:
Robt P Kitchel.

INVENTOR
Frank Beemer
BY
Augustus B. Voughton.
ATTORNEY.

Patented Nov. 19, 1929

1,736,110

UNITED STATES PATENT OFFICE

FRANK BEEMER, OF PHILADELPHIA, PENNSYLVANIA, ASSIGNOR TO NICE BALL BEARING COMPANY, OF PHILADELPHIA, PENNSYLVANIA, A CORPORATION OF PENNSYLVANIA

BALL-BEARING CASTER

Application filed June 25, 1927. Serial No. 201,409.

The principal object of the present invention is to provide a pressed metal ball bearing swivel caster of which both the pedestal and yoke elements comprise but three stampings and which is strong, efficient and comparatively inexpensive.

To these and other ends hereinafter set forth the invention, generally stated, consists of a pressed metal ball bearing swivel caster including three tubular stampings of which two constitute the pedestal and are spaced apart and connected at the outer periphery by a lapped joint provided on the stampings and of which the third tubular stamping constitutes a yoke and is provided with arms projecting in one direction and with a flaring reversely curved annular flange projecting in the other direction and into the space provided between the first mentioned two stampings, two rows of balls disposed in said space and on opposite sides of said flaring flange, and a wheel mounted in the arms.

The invention also comprises the improvements to be presently described and finally claimed.

In the following description reference will be made to the accompanying drawings forming part hereof and in which Figure 1 is a side view with parts broken away and parts in section illustrating a caster embodying features of the invention.

Fig. 2 is a front view of the same, and

Figure 3:
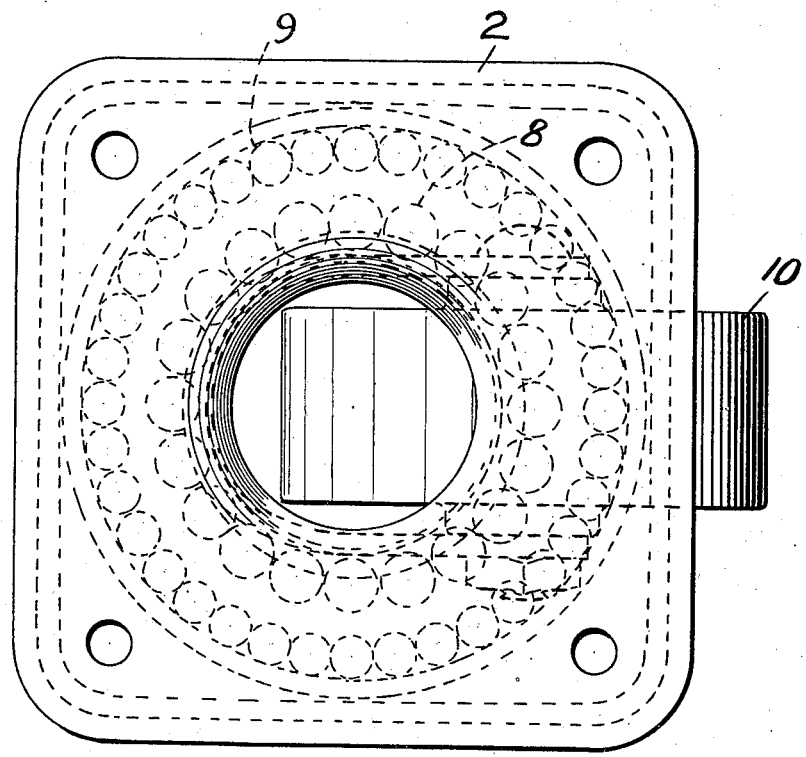
Fig. 3 is a top or plan view.

In the drawings 1 and 2 are tubular stampings. They are dished to provide space 3 between them and they are connected at their peripheries or outer edges by a lapped joint 4. As shown these stampings 1 and 2 are rectangular in outline at their outer edges and are circular in outline at their inner edges. A third tubular stamping 5 is provided with arms 6 projecting in one direction and with a flaring reversely curved annular flange 7 projecting in the other direction and into the space 3. 8 and 9 are two rows of balls disposed in the space 3 and arranged on opposite sides of the flaring flange 7. 10 is a wheel rotatably mounted in the arms 6.

It will be obvious to those skilled in the art to which the invention relates that modifications may be made in details of construction and arrangement and in matters of mere form without departing from the spirit of the invention which is not limited to such matters or otherwise than the prior art and the appended claim may require.

I claim:

A pressed metal ball bearing swivel caster comprising three tubular stampings of which two are dished and constitute a pedestal and are spaced apart and connected at the outer periphery by a lapped joint provided on the stampings and of which the third tubular stamping constitutes a yoke and is provided with arms projecting in one direction and with a flaring reversely curved annular flange projecting in the other direction and into the space provided between the first mentioned two stampings, two rows of balls disposed in said space and on opposite sides of said flaring flange, and a wheel mounted in said arms.

FRANK BEEMER.